US006999790B2

(12) United States Patent
Takamine et al.

(10) Patent No.: US 6,999,790 B2
(45) Date of Patent: Feb. 14, 2006

(54) PORTABLE TERMINAL, CONTROLLED APPARATUS CONTROLLED BY PORTABLE TERMINAL, AND COOPERATION SYSTEM

(75) Inventors: Kouichi Takamine, Hyogo (JP); Atsushi Hirose, Hyogo (JP); Hiroshi Terada, Nara (JP); Akimasa Sato, Fukuoka (JP); Michiaki Nobuoka, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 379 days.

(21) Appl. No.: 10/246,766

(22) Filed: Sep. 19, 2002

(65) Prior Publication Data

US 2003/0069038 A1   Apr. 10, 2003

(30) Foreign Application Priority Data

Sep. 20, 2001   (JP)   ............................. 2001-287673

(51) Int. Cl.
*H04M 1/00*   (2006.01)

(52) U.S. Cl. .................................. 455/556.1; 455/41.2

(58) Field of Classification Search ................ 455/556, 455/419–420, 414, 418, 466, 432–435, 455, 455/458, 556.1, 41.2, 557, 566, 414.1, 550, 455/90.3, 500.1; 379/201.07, 201.08, 201.02, 379/201.03; 320/400–402; 348/211.1, 207.1; 358/296, 400, 500; 345/168–170
See application file for complete search history.

(56) References Cited

U.S. PATENT DOCUMENTS

| 5,138,649 | A | * | 8/1992 | Krisbergh et al. .......... 455/420 |
| 5,671,267 | A | * | 9/1997 | August et al. .............. 455/420 |
| 6,351,639 | B1 | * | 2/2002 | Motohashi .................. 455/420 |
| 6,445,933 | B1 | * | 9/2002 | Pettit ........................ 455/556.1 |
| 6,615,038 | B1 | * | 9/2003 | Moles et al. ................ 455/418 |
| 6,832,102 | B1 | * | 12/2004 | I'Anson ................... 455/556.1 |
| 2002/0037714 | A1 | * | 3/2002 | Takae et al. ................ 455/419 |
| 2005/0009561 | A1 | * | 1/2005 | Hollstrom et al. ....... 455/556.1 |

FOREIGN PATENT DOCUMENTS

| EP | 562890 A1 | * | 9/1993 |
| JP | 2001-320784 | | 11/2001 |

\* cited by examiner

*Primary Examiner*—Pablo N. Tran
(74) *Attorney, Agent, or Firm*—McDermott Will & Emery LLP

(57) ABSTRACT

Communication device of the portable terminal receives a function changing program. Function changing device is realized by executing the function changing program A cooperation device of the controlled apparatus controls the controlled apparatus by operating in cooperation with the function changing program on the portable terminal. With such a construction, the portable terminal can be used as a pointing device of the controlled apparatus.

15 Claims, 19 Drawing Sheets

FIG.7

| | KEYS | REGULAR FUNCTIONS | FUNCTIONS AFTER CDHANGE |
|---|---|---|---|
| (1) | 102A | POWER OFF | (REGULAR FUNCTION, NOT CHANGED) |
| (2) | 102B | TRANSMISSION/ RECEPTION | TRANSMISSION/RECEPTION VIA WIRELESS IF PROCESSING MEANS |
| (3) | 102C | CHANGEOVER BETWEEN FUNCTIONS | CHANGEOVER BETWEEN FUNCTIONS,YES |
| (4) | 102D | JUMP RETURN | JUMP RETURN,NO |
| (5) | 102E | SELECTION IN MENUS, DETERMINATION | SELECTION OF PRINT MENU, DETERMINATION |
| (6) | 102F | 1 "A"COLUMN IN JAPANESE SYLLABARY @ . _ | (REGULAR FUNCTION, NOT CHANGED) |
| | 102G | 2 "KA"COLUMN IN JAPANESE SYLLABARY A B C | (REGULAR FUNCTION, NOT CHANGED) |
| | 102H | 3 "SA"COLUMN IN JAPANESE SYLLABARY D E F | (REGULAR FUNCTION, NOT CHANGED) |
| | 102I | 4 "TA"COLUMN IN JAPANESE SYLLABARY G H I | (REGULAR FUNCTION, NOT CHANGED) |
| | 102J | 5 "NA" COLUMN IN JAPANESE SILLABARY J K L | (REGULAR FUNCTION, NOT CHANGED) |
| | 102K | 6 "HA"COLUMN IN JAPANESE SYLLABARY M N O | (REGULAR FUNCTION, NOT CHANGED) |
| | 102L | 7 "MA"COLUMN IN JAPANESE SYLLABARY P Q R S | (REGULAR FUNCTION, NOT CHANGED) |
| | 102M | 8 "YA"COLUMN IN JAPANESE SYLLABARY T U V | (REGULAR FUNCTION, NOT CHANGED) |
| | 102N | 9 "RA"COLUMN IN JAPANESE SYLLABARY W X Y Z | (REGULAR FUNCTION, NOT CHANGED) |
| | 102O | * " ° ､ ｡ | (REGULAR FUNCTION, NOT CHANGED) |
| | 102P | 0 "WA" "WO" "NN" | (REGULAR FUNCTION, NOT CHANGED) |
| | 102Q | # ↵ | (REGULAR FUNCTION, NOT CHANGED) |

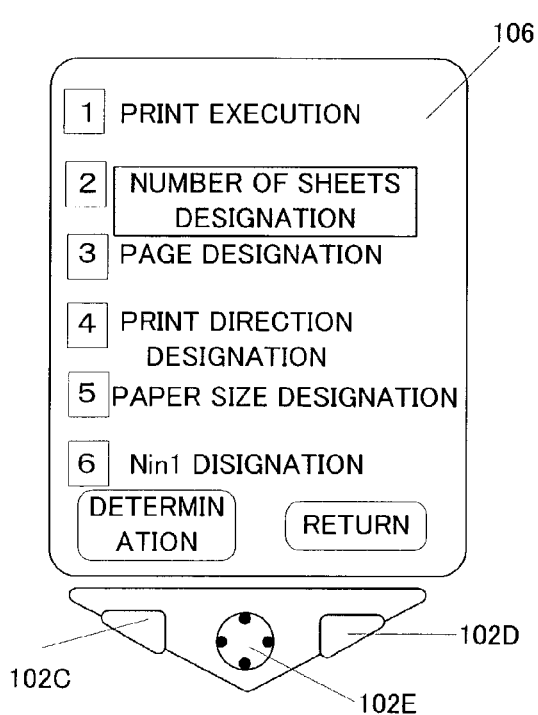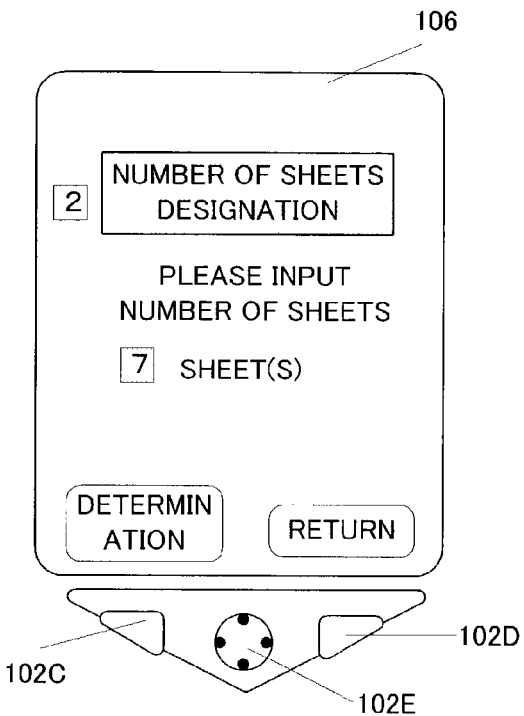

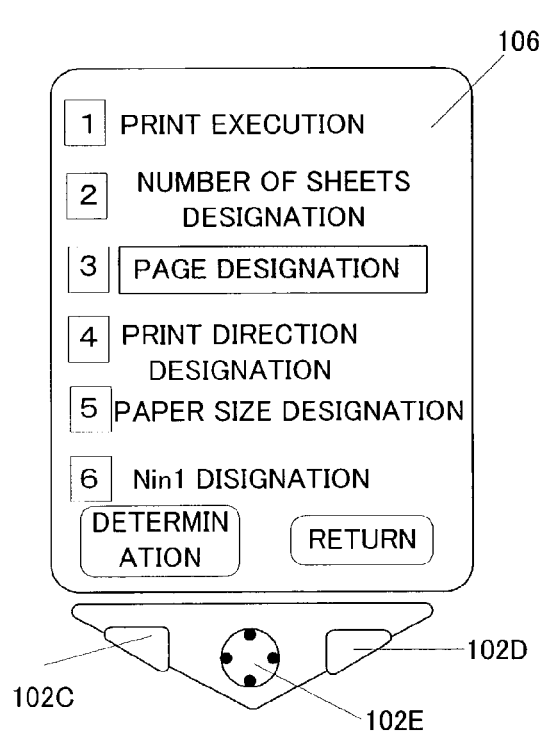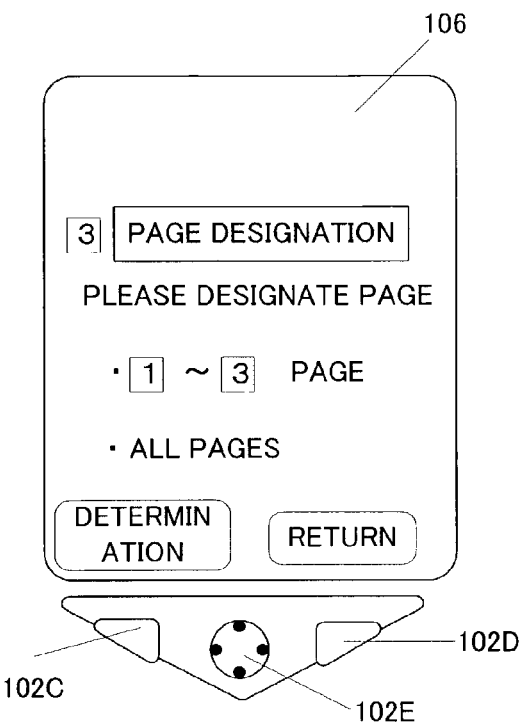
FIG.9 A  FIG.9 B

PORTABLE TERMINAL, CONTROLLED APPARATUS CONTROLLED BY PORTABLE TERMINAL, AND COOPERATION SYSTEM

BACKGROUND OF THE INVENTION

1. Field of the Invention

The present invention relates to a cooperation system in which a portable terminal and a controlled apparatus operate in cooperation with each other.

2. Description if the Related Art

Devices for pointing at a position on a screen image are collectively referred to as a pointing device. Among them, a mouse and a trackball are typical as the pointing device.

A mouse measures directions and distances of movement to transmit values thereof to a computer. Furthermore, one to several switches are attached to a mouse at a position of a finger tip or positions of finger tips of an operator's hand placed on the mouse so as to cover the top and side portions thereof with a palm of the hand. By pushing down a switch, one of various kinds of commands can be given to a computer.

A trackball is of a structure as would be observed if a mouse was turned upside down. A trackball is functionally the same as a mouse in that directions and distances of movement as a mouse of the trackball are transmitted to a computer according to movement of the ball. Since the body of a trackball is embedded in a keyboard, an advantage can be enjoyed that reduction in occupancy area can be attained compared with a mouse.

Other pointing devices have been developed: such as a joystick, an electronic pen and others. A joystick tilts a lever thereof, to the back and forth, and to the right and left, and directions and distances of movement thereof are transmitted to a computer according to its movement. An electronic pen has the shape of a ball point pen and transmits directions and distances of movement thereof to a computer.

If a pointing device as described above is adopted, an apparatus is greatly improved on its operability.

Among apparatuses, however, some has difficulty adopting a pointing device. For example, since a printer does not have display means (if any, it is small in size), even if a pointing device was adopted in such an apparatus, no improvement on its operability would be expected.

It is natural that if large display means is installed, there arises a merit of adopting a pointing device. A printer with large display means, however, would suffer a demerit of higher cost or the like.

SUMMARY OF THE INVENTION

The present invention was proposed in light of the above circumstances and it is an object of the present invention to improve operability of an apparatus difficult to adopt a pointing device.

The present invention is, in a broader sense, a cooperation system in which a portable terminal and a controlled apparatus operate in cooperation with each other. The portable terminal includes communication means and function changing means each of which will be described below.

The communication means receives a function changing program which is a program for changing a function of the portable terminal so as to function as operation means of a controlled apparatus. The function changing means is reaslized by executing the function changing program.

The controlled apparatus includes communication means and cooperation means each of which will be described below.

The communication means transmits a function changing program, which is a program for changing a function of a portable terminal so as to function as operation means of the controlled apparatus, to the portable terminal. The cooperation means controls the controlled apparatus by operating in cooperation with a function changing program on the portable terminal.

With such a construction adopted, a portable terminal can be used as a pointing device of a controlled apparatus. Therefore, even if the controlled apparatus is an apparatus (for example, a printer) difficult to adopt a pointing device, its operability can be greatly improved.

While a function changing program, here, is transmitted from a controlled apparatus to a portable terminal, the present invention is not limited to this construction. That is, a similar effect can also be obtained in a construction in which a portable terminal has storage means storing a function changing program in advance therein.

BRIEF DESCRIPTION OF THE DRAWINGS

FIG. 7 is a table showing a change in function of input means of a mobile phone;

FIGS. 8A and 8B illustrate example menus presented on display means of a mobile phone in a case where the number of print sheets is designated;

FIGS. 9A and 9B illustrate example menus presented on display means of a mobile phone in a case where a print page is designated;

DESCRIPTION OF THE PREFERRED EMBODIMENTS

Detailed description will be given of embodiments of the present invention according to the accompanying drawings.

It should be noted that i-appli used in the following description is a program written in Java language and basically the same as Java applet. That is, a program executed on a browser among programs written in Java language is referred to as Java applet, while a program of the kind executed on a mobile phone or the like is referred to as i-appli.

First Embodiment

Figure 1:
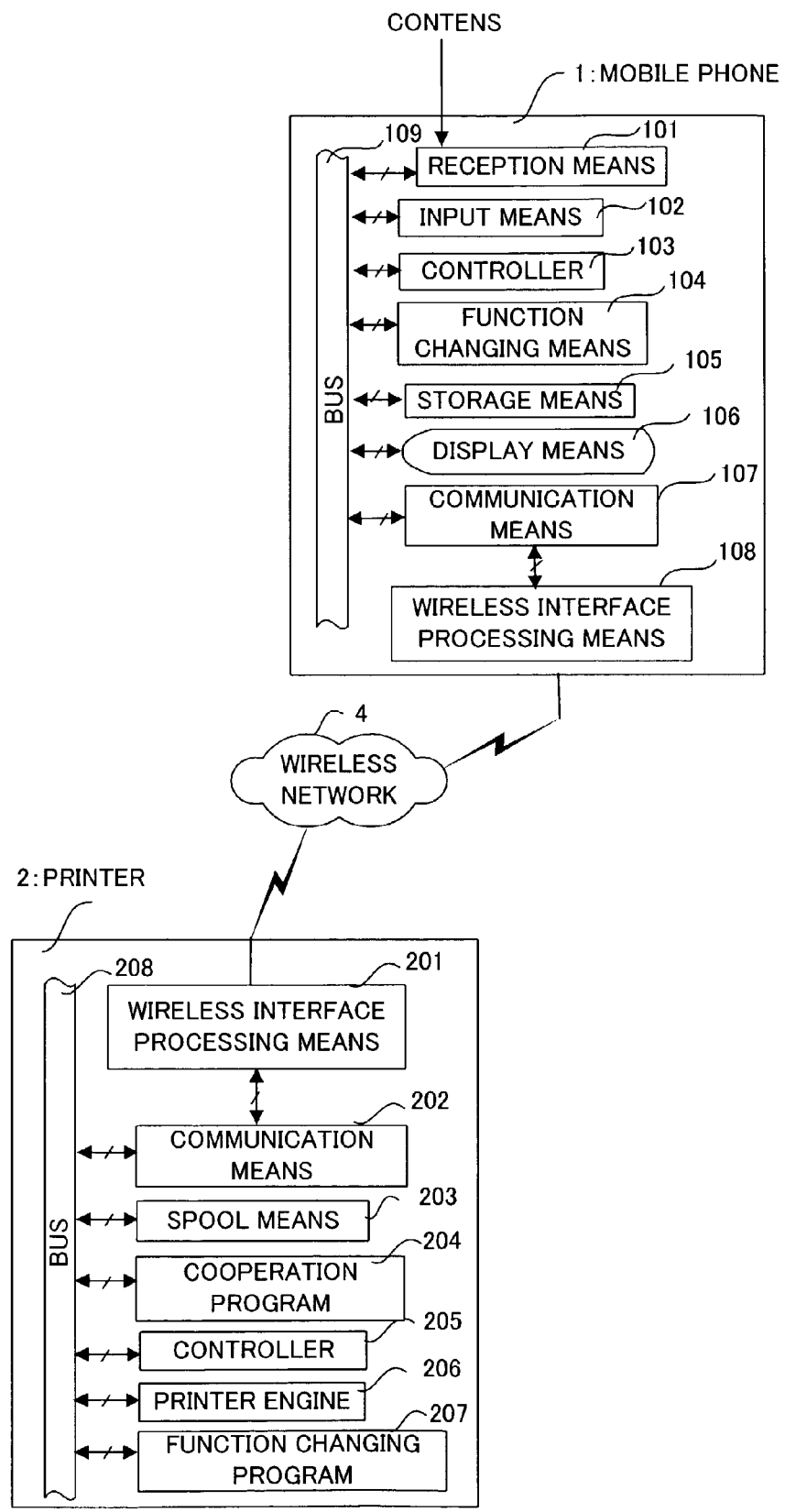
FIG. 1 is a diagram of construction of a cooperation system in a first embodiment.

FIG. 1 is a diagram of construction of a cooperation system in which a mobile phone (portable terminal) 1 having an operating environment for JAVA language sub-set (i-appli) therein and a printer (an imaging apparatus) 2 operate in cooperation with each other. Description of a construction thereof will be given below together with description of operations therein.

Figure 4:
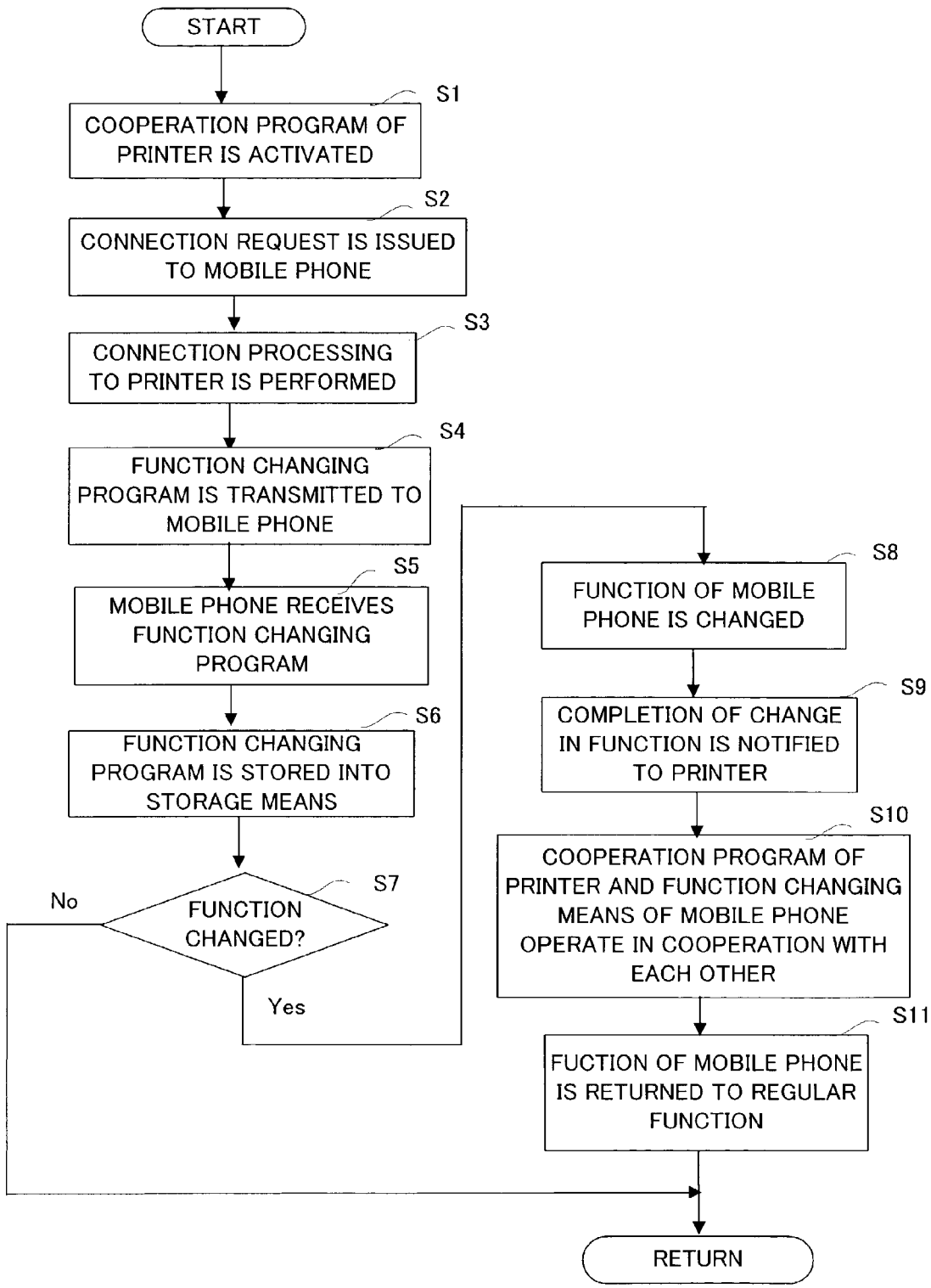
FIG. 4 is a flow chart showing a cooperating operation in the first embodiment.

When a cooperation program 204 of the printer 2 is at first activated, a controller 205 issues a connection request to the mobile phone 1 through a bus 208, communication means 202, wireless interface processing means 201 and a wireless network 4 (in FIG. 4, step S1 to step S2). As the wireless network 4, there can be adopted a network of Bluetooth specification, wireless 1394: a wireless version of IEEE std 1394 (IEEE: The Institute of Electrical and Electronics Engineers, Inc.) and others.

Then, wireless interface processing means 108 of the mobile phone 1 having accepted the connection request performs a connection processing to the printer 2 (in FIG. 4, step S3). When connection between the mobile phone 1 and the printer 2 is established, a controller 205 of the printer 2 transmits a function changing program 207 stored in storage means (not shown) to the mobile phone 1 (in FIG. 4, step S4).

The function changing program 207 is preferably written in an intermediate language such as Java. By doing so, the function changing program 207 can be executed without depending on a kind of an OS (Operating System) of the mobile phone 1 or a kind of a microprocessor.

The function changing program 207, after being stored in storage means 105 of the mobile phone 1, is activated by a controller 103 of the mobile phone 1 (in FIG. 4, step S5 to S6). The function changing program 207 having been thus activated (the function changing program 207 in execution is hereinafter referred to as "function changing means 104") makes contact with a user and inquires whether or not a function of the mobile phone 1 is changed by presenting a message such as saying "IS A FUNCTION CHANGED?" on display means 106 (in FIG. 4, step S7).

In order to enable the user to answer to the inquiry, "YES KEY" and "NO KEY" are presented on the display means 106 instead of, for example, "FUNCTIONAL KEY" and "JUMP KEY" as a regular display of the mobile phone 1. Then, function changing means 104, when the user selects "NO KEY" in this state, ceases the process without changing a function of the mobile phone 1, while to the contrary, when the user selects "YES KEY", changing a function of the mobile phone 1 so that the mobile phone 1 functions as a pointing device of the printer 2 (in FIG. 4, step S8).

The "changing a function" used herein (details thereof will be described later) is not limited to only changing of a regular function of the mobile phone 1. That is, addition of a new function to the mobile phone 1 is included in the "changing a function" used here.

The "pointing device" used here is not a pointing device in a narrow sense (a device pointing at a position on a screen image). That is, the mobile phone 1 is generally provided with plural keys 102F to 102Q (hereinafter, in some case, collectively referred to "input means 102") and display means 106. Therefore, the input means 102 and the display means 106, here, are collectively referred to as a pointing device (or operation means).

When a change in function of the mobile phone 1 is completed, the function changing means 104 notifies the printer 2 of the completion of the change in function (in FIG. 4, step S9). At this time, the function changing means 104 preferably presents a message such as "A FUNCTION HAS BEEN CHANGED", for example, on the display means 106. By doing so, it is possible to notify the user of a change in function of the mobile phone 1.

Hereinafter, the cooperation program 204 of the printer 2 (hereinafter referred to as "cooperation means 204" when linking program 204 is in activation) and the function changing means 104 of the mobile phone 1 operate in cooperation with each other. With such cooperation between both means, the mobile phone 1 can be used as a pointing device of the printer 2 (in FIG. 4, step 10).

When "RETURN KEY" is pushed down after the change in function, a function of the mobile phone 1, which has changed as described above, can be returned to the regular function (in FIG. 4, step S11). Not only when Return key is pushed down in such a way, but when a call is received, it is preferable that a function of the mobile phone 1, which has changed as described above, is returned to the regular function.

It is natural that when a call is received, a function of the mobile phone 1 is not automatically returned to the regular function, but by making contact with the user, it may be inquired whether or not returned to the regular function. Such inquiry can be realized by presenting a message such as saying "IS A FUNCTION RETURNED TO THE REGULAR ONE?" on the display means 106 using the function changing means 104.

Furthermore, there is also preferably presented the message saying "IS A FUNCTION RETURNED TO THE REGULAR ONE?" on the display means together with information of a transmitter. The "information of a transmitter" used here includes telephone number information of the transmitter, name information corresponding to the telephone number and others. The name information corresponding to the telephone number has only to be obtained from an address book that the mobile phone has therein. Since the address book function is a function that an ordinary mobile phone has therein, detailed description thereof here will not be repeated. When the transmitter information is presented on the display means 106 in such a way, needless to say that it facilitates judgment on whether or not a function of the mobile phone 1 is returned to the regular one.

When a function of the mobile phone 1 is returned to the regular one, the function changing means 104 saves a processing in progress prior to the change in function. Naturally, when the processing causing the saving (for example, talking) is over, the saved processing is reopened.

Figure 6:
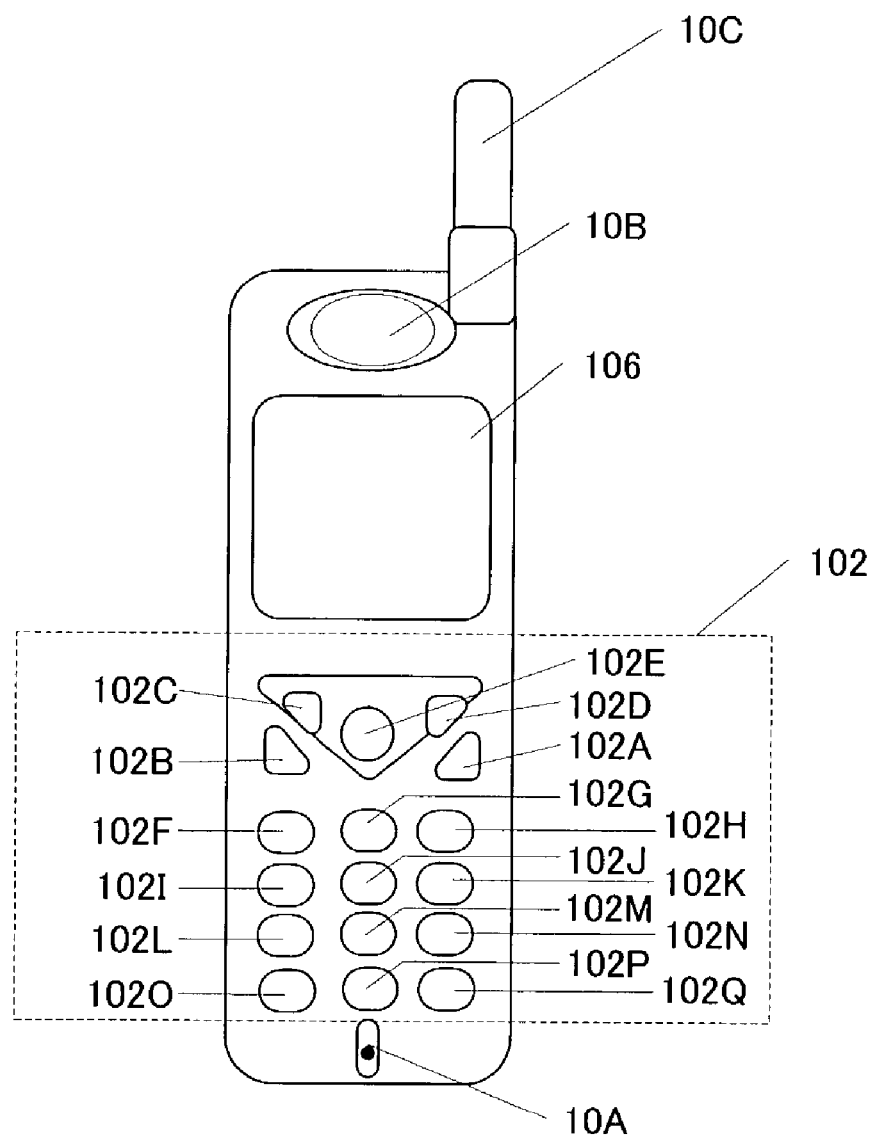
FIG. 6 illustrates an outward appearance of a mobile phone.
Figure 10:
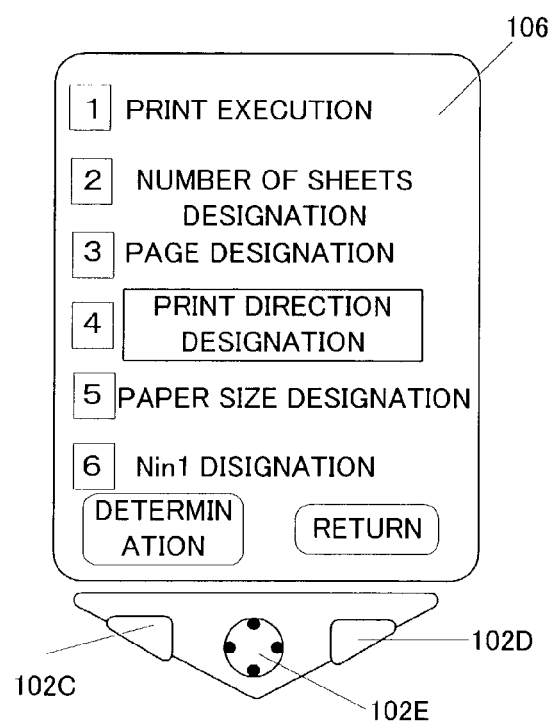
FIGS. 10A and 10B illustrate example menus presented on display means of a mobile phone in a case where print direction is designated.
Figure 10:
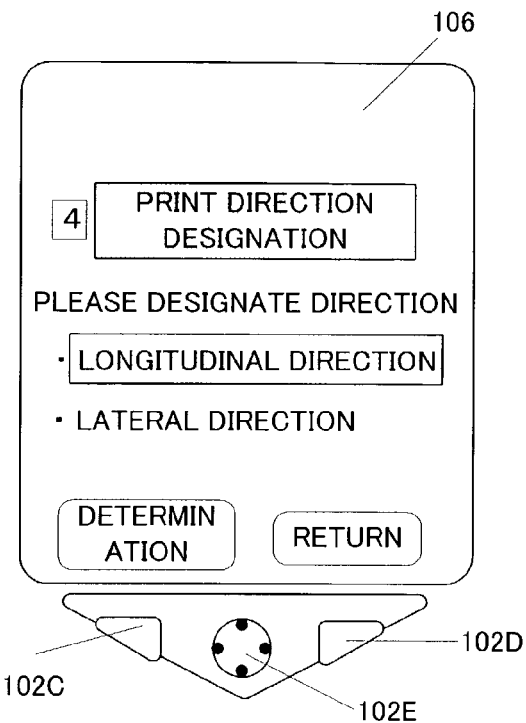
Figure 11:
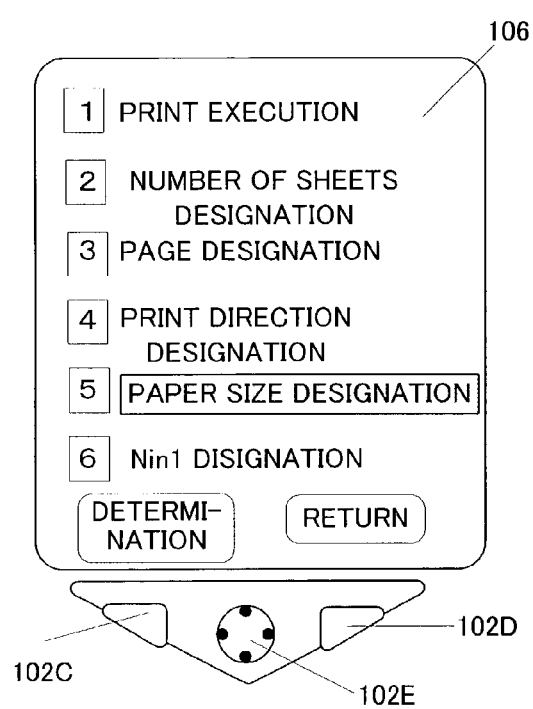
FIGS. 11A and 11B illustrate example menus presented on display means of a mobile phone in a case where a paper size is designated.
Figure 11:
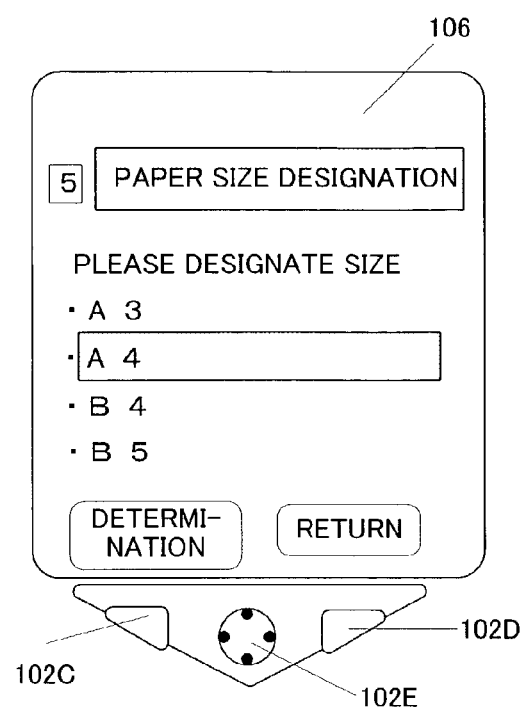
Figure 12:
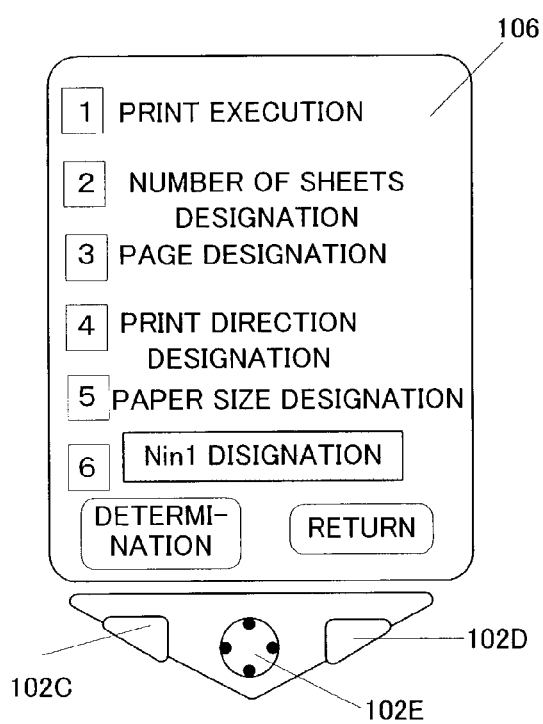
FIGS. 12A and 12B illustrate example menus presented on display means of a mobile phone in a case where Nin1 is designated.
Figure 12:
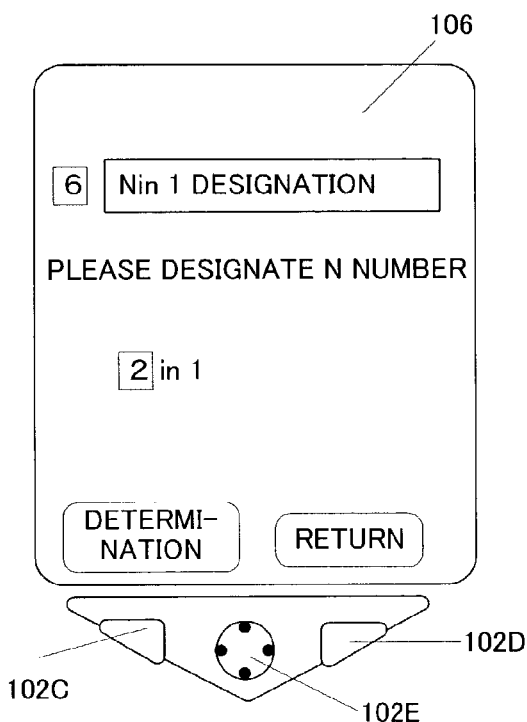
Figure 13:
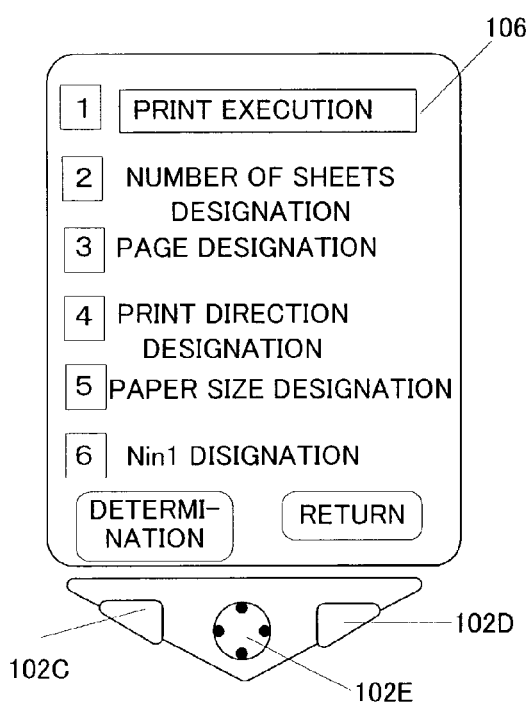
FIGS. 13A and 13B illustrate example menus presented on display means of a mobile phone in a case where print execution is designated.
Figure 13:
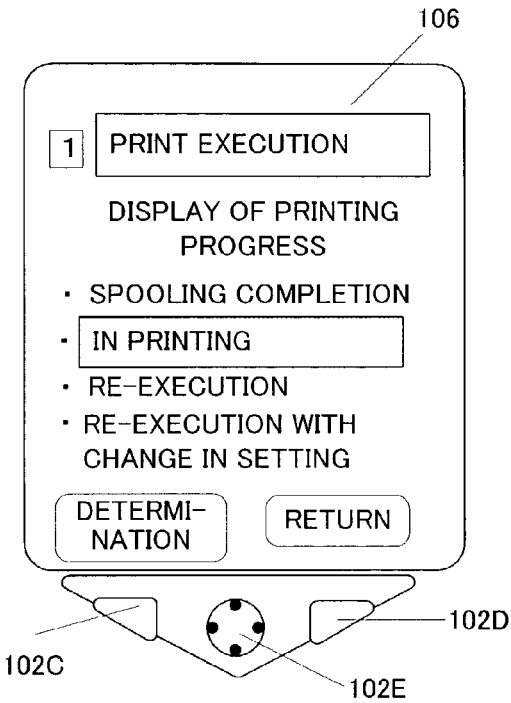

As shown in FIG. 6, an ordinary telephone 1 is provided with input means 102, the display means 106, voice input means 10A, voice output means 10B and an antenna 10C. None of descriptions will be given of the display means 106, the voice input means 10A, the voice output means 10B and antenna 10C since those are not related directly to the change in function and description will be given of an example of a change in function of input means 102 below using FIG. 7.

A key 102A is a key for turning on or off a power supply of the mobile phone 1 and furthermore, for terminating an input operation, communication and others. A function of the key 102A maintains its regular function as shown in (1) of FIG. 7 even after the function changing program 207 is activated.

Keys 102F to 102Q are keys for inputting alphabetical letters, numerals, Japanese kana letters. Functions of the keys 102F to 102Q also maintains the regular functions thereof as shown in (6) of FIG. 7 even after the function changing program 207 is activated.

On the other hand, a key 102B is a key for connecting telephone lines to each other and for transmitting/receiving of data. The key 102B, when the function changing program 207 is activated, works as a key for transmitting/receiving of data via a wireless interface processing means 108 as shown in (2) of FIG. 7.

A Key 102C is a key for changing over among an apparatus mode setting function, an address book function, a mail function and others. The key 102C, when the function changing program 207 is activated, works as a key for replying "YES" to the message saying "IS A FUNCTION CHANGED?" in addition to the regular changeover function as shown in (3) of FIG. 7.

A key 102D is a key for jumping to various menus that the mobile phone 1 has therein or returning to a display prior to the jump. The key 102D, when the function changing program 207 is activated, works as a key for replying "NO" to the message "IS A FUNCTION CHANGED?" in addition to the regular jump function as shown in (4) of FIG. 7.

Finally, a key 102E is a key for scrolling menus present on the display means 106 to select one and for determining execution of the thus selected menu. The key 102E, when the function changing program 207 is activated, works as a key for scrolling print menus to select one and for determining execution of the thus selected menu.

It is natural that in a case where a function of the mobile phone 1 is changed, it is required to notify a user of the change in function. No specific limitation is imposed on a way of notification, but a method is preferably adopted in which a correspondence between a regular function and a function after change of the mobile phone 1 is presented on the display means 106 by the function changing means 104. Since such a notification method is widely known as a help function that an ordinary application software has therein, no detailed description thereof here is presented.

Description will be given of examples of a print menu presented on the display means 106 of the mobile phone 1 after the function changing program 207 is activated below according to FIGS. 8 to 13.

In a case where the number of print sheets is designated, "DESIGNATION OF THE NUMBER OF PRINT SHEETS" is selected using the key 102E as shown in FIG. 8A. When the key 102E is pushed down in this state, a state is obtained in which the number of print sheets can be designated as shown in FIG. 8B. After the number of print sheets is designated using the keys 102F to 102Q in this state, the key 102E is pushed down.

In a case where a print page is designated, "PAGE DESIGNATION" is selected using the key 102E as shown in FIG. 9A. When the key 102E is pushed down in this state, a state is obtained in which a print page can be designated as shown in FIG. 9B. After the number of pages is inputted using the keys 102F to 102Q or after "ALL THE PAGES" are designated in this state, the key 102E is pushed down. In a case where "ALL THE PAGES" are designated, needless to say that all the pages of the data are printed.

In a case where a print direction is designated, "DESIGNATION OF PRINT DIRECTION" is selected using the key 102E as shown in FIG. 10A. When the key 102E is pushed down in this state, a state is obtained in which a print direction can be designated as shown in FIG. 10B. After a print direction (that is, a "LONGITUDINAL PRINT DIRECTION" or a "LATERAL PRINT DIRECTION") is designated in this state, the key 102E is pushed down.

In a case where a paper size is designated, "PAPER SIZE DESIGNATION" is selected using the key 102E as shown in FIG. 11A. When the key 102E is pushed in this state, a state is obtained in which a paper size can be designated as shown in FIG. 11B. After a paper size is designated in this state, the key 102E is pushed down.

In a case where Nin1 (that is, the number of pages N incorporated in one sheet) is designated, "Nin1 DESIGNATION" is selected using the key 102E as shown in FIG. 12A. When the key 102E is pushed down in this state, a state is obtained in which a value of N can be designated as shown in FIG. 12B. After the value of N is designated in this state, the key 102E is pushed down.

In a case where printing is executed, "PRINT EXECUTION" is selected using the key 102E as shown in FIG. 13A. When the key 102E is pushed down in this state, printing is executed and progress of printing is displayed in real time as shown in FIG. 13B. While here is exemplified a state in which printing is going after completion of spooling, a display of "IN PRINTING" is changed to a display of "COMPLETION OF PRINTING" when the printing is completed.

Note that in a case where, after printing is completed, printing is re-executed in the same print condition, "RE-EXECUTION" is designated using the key 102E. That is, a condition (print setting) at the immediately preceding stage is stored in a memory not shown in the mobile phone 1. Therefore, when "RE-EXECUTION" is designated using the key 102E, printing is re-executed on the basis of the print setting stored in the memory.

Of course, printing can be re-executed in a different condition. That is, when "RE-EXECUTION WITH A CHANGE IN SETTING" is designated using the key 102E, a change can be made in contents in setting such as "DESIGNATION OF THE NUMBER OF SHEETS", "PAGE DESIGNATION" and "DESIGNATION OF PRINT DIRECTION".

According to the present invention, as described above, the mobile phone 1 can be used as a pointing device of the printer 2 by means of a simple method in which the mobile phone 1 is installed with the function changing program 207, which is stored in advance in the printer 2. Thereby, needless to say that operability of the printer 2 is greatly improved.

Note that though not specifically referred to in the above description, receive means 101 of the mobile phone 1 is means for receiving contents written in CTML (Compact Hyper Text Markup Language) from the internet. Spool means 203 of the printer 2 is means for spooling print data to a printer engine 206 from the wireless interface processing means 201. Printing methods adopted by the printer engine 206 are of many kinds and include a thermal transfer method (divided into a sublimation type and a hot-melt type), a thermographic method, an ink-jet method, an electrophotographic method and others, without limiting to any specific method among them.

Second Embodiment

Figure 2:
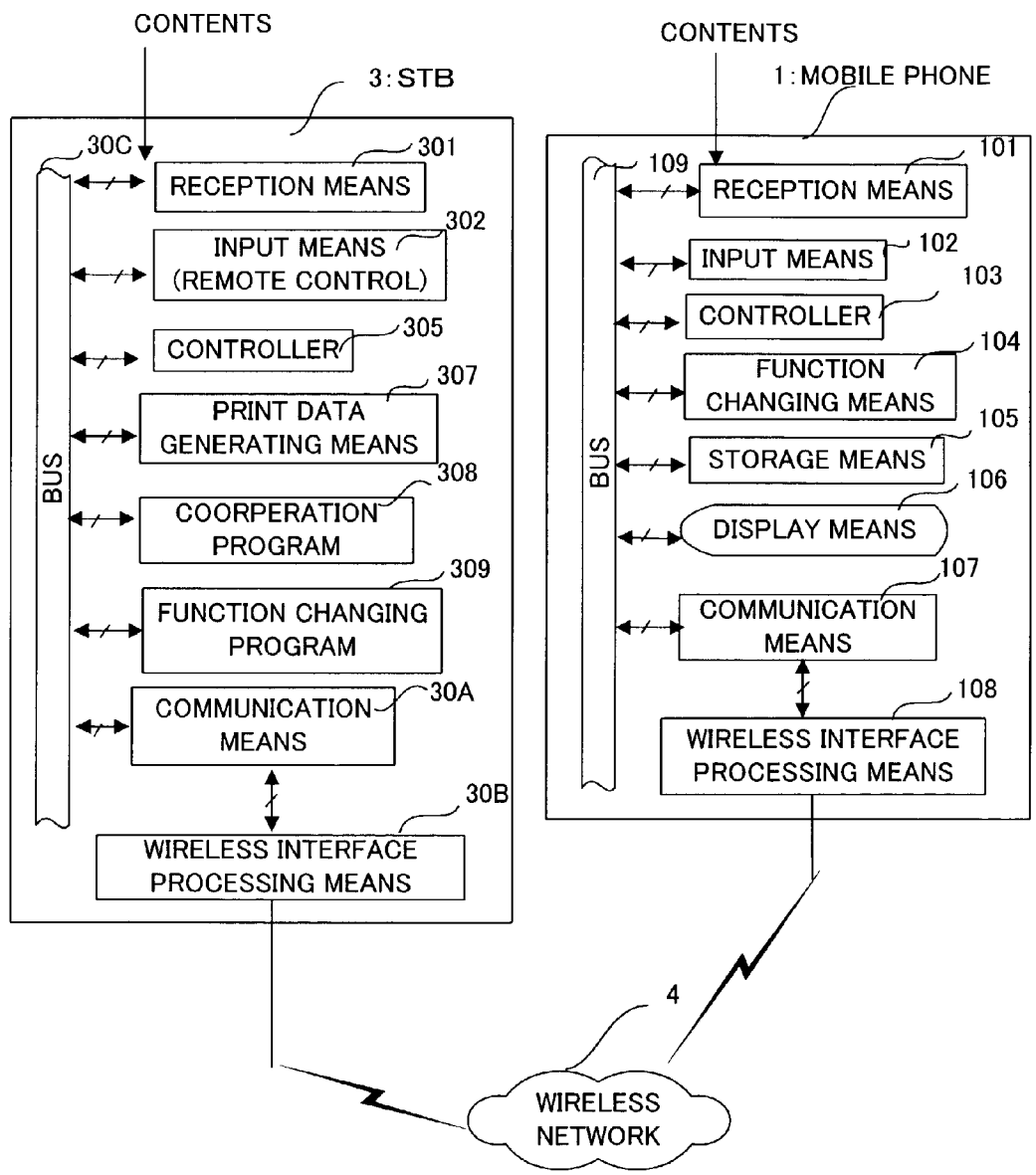
FIG. 2 is a diagram of construction of a cooperation system in a second embodiment.

FIG. 2 is a diagram of construction of a cooperation system in which a mobile phone (portable terminal) 1 having an operating environment for i-appli therein and a set top box 3 operate in cooperation with each other and description will be given of a configuration thereof and operations therein. Note that the set top box 3 is a receiver receiving contents written in BML (Broadcast Markup Language) from a broadcast station to enable the contents to be read.

Operations performed till a cooperation program 308 of the set top box 3 (the cooperation program 308 in execution is hereinafter referred to as the "cooperation means 308") and the function changing means 104 of the mobile phone 1 operate in cooperation with each other are basically the same as those performed till the cooperation means 204 of the printer 2 and the function changing means 104 operate in cooperation with each other (see the first embodiment).

Figure 5:
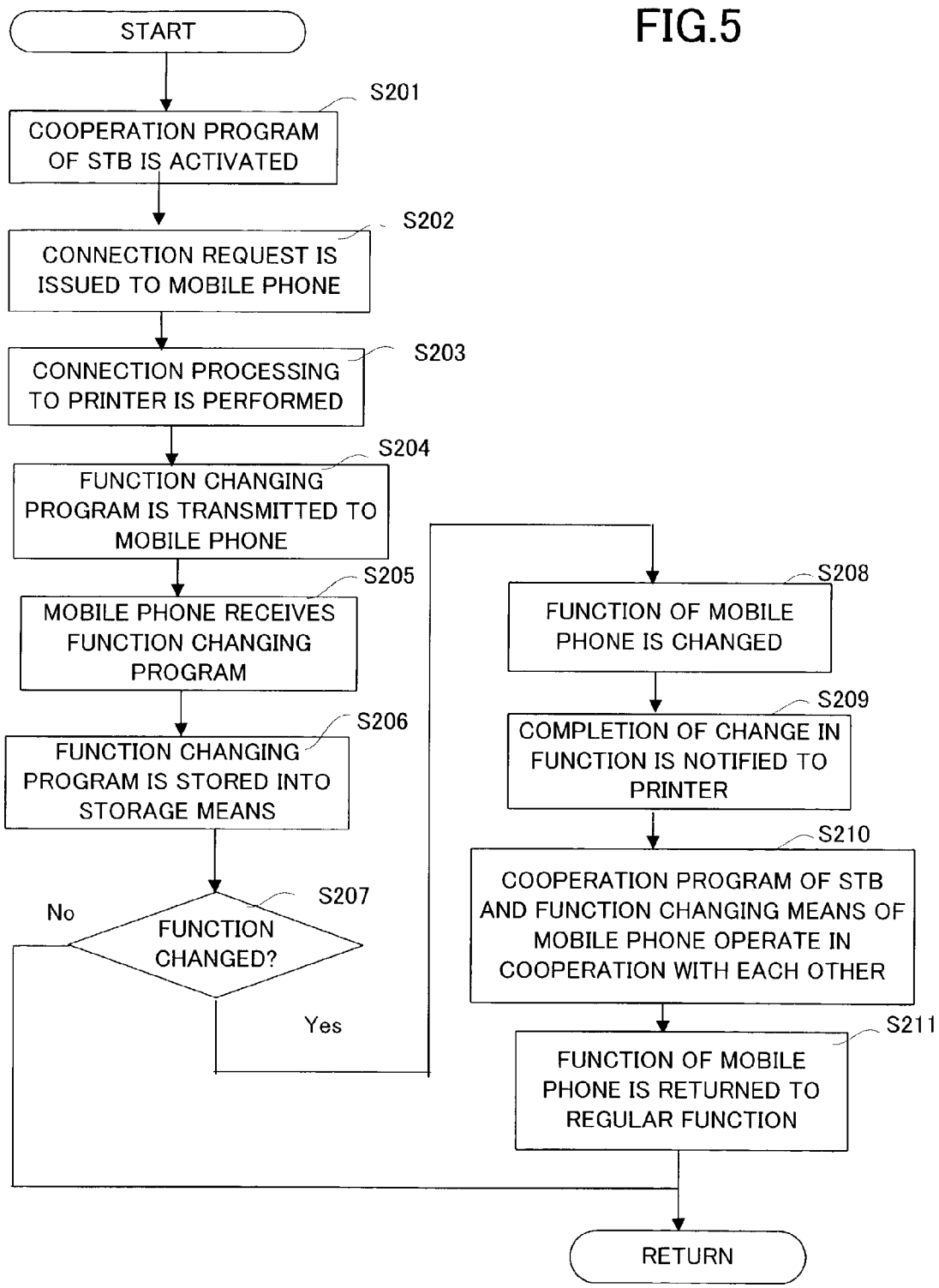
FIG. 5 is a flow chart showing a cooperating operation in the second embodiment.

That is, when the cooperation program 308 of the set top box 3 is activated, a controller 305 issues a connection request to the mobile phone 1 via a bus 30C, a communication means 30A, a wireless interface processing means 30B, a wireless network 4 (In FIG. 5, step S201 to S202). The wireless interface processing means 108 of the mobile phone 1 having accepted the connection request performs connection processing to the set top box 3 (in FIG. 5, step S203). When connection is established between the mobile phone 1 and the set top box 3, the controller 305 of the set top box 3 transmits a function changing program 309 stored in storage means (not shown) to the mobile phone 1 (in FIG. 5, step S204). The function changing program 309 is also preferably written in an intermediate language such as Java.

After being stored in the storage means 105 of the mobile phone 1, the function changing program 309 is activated by the controller 103 of the mobile phone 1 (in FIG. 5, step S205 to S206). The function changing program 309 having been thus activated (the function changing program 309 in execution is hereinafter referred to as a "function changing means 104") presents a message such as saying "IS A FUNCTION IS CHANGED?" on the display means 106 to thereby ask a user whether or not a function of the mobile phone 1 is changed (in FIG. 5, step S207). Then, the function changing means 104, when the user selects "NO KEY" in this state, terminates the process without changing a function of the mobile phone 1, while to the contrary, when the user selects "YES KEY" in this state, changing a function of the mobile phone so that the mobile phone 1 works as a pointing device of the set top box 3 (in FIG. 5, step S208).

When a change in function of the mobile phone 1 is completed, the function changing means 104 notifies the set top box 3 of the completion of the change in function (in FIG. 5, step S209). Thereafter, the cooperation means 308 of the set top box 3 and the function changing means 104 of the mobile phone 1 operate in cooperation with each other. In this state, the mobile phone 1 can be used as a pointing device of the set top box 3 (in FIG. 5, step S210). Naturally, when "RETURN KEY" after the change in function is pushed down, a function of the mobile phone 1 having been changed as described above can be returned to the regular function thereof (in FIG. 5, step S211).

Since an example modification of a change in function of the input means 102 of the mobile phone 1 is the same as in the first embodiment, description thereof herein will not be repeated. Description will be given of an example of main menu presented on the display means 106 of the mobile phone 106 after the function changing program 309 is activated.

Figure 14:
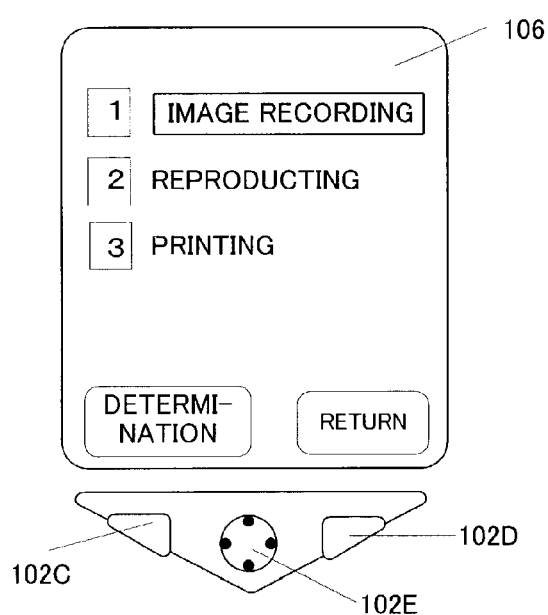
FIGS. 14A and 14B illustrate example menus presented on display means of a mobile phone in a case where image recording is designated.
Figure 14:
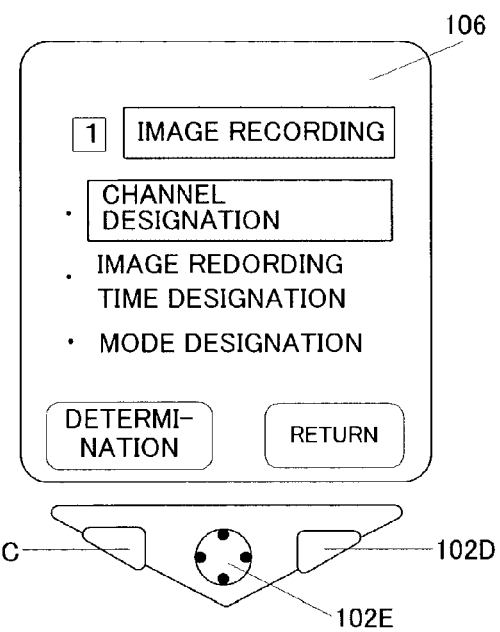

That is, when image recording is designated, "IMAGE RECORDING", as shown in FIG. 14A, is selected using the key 102E. When the key 102E is pushed down in this state, a state is obtained in which "CHANNEL", "IMAGE RECORDING TIME" and "IMAGE RECORDING MODE" can be selected, as shown in FIG. 14B. After "CHANNEL" or the like is selected using the keys 102F to 102Q in this state, the key 102E is pushed down.

It is natural that when the key 102E is pushed down after the selection of "CHANNEL", a submenu for designating a channel is displayed. Furthermore, when the key 102E is pushed down after the selection of "IMAGE RECORDING TIME", a submenu for designating an image recording time is displayed. Moreover, when the key is pushed down after the selection of "IMAGE RECORDING MODE", a submenu for designating an image recording mode us displayed.

Since such an operation is an ordinary image recording operation, no detailed description thereof is given here. Since an operation when "REPRODUCING" shown in FIG. 14A is selected is an ordinary image reproduction operation, no detailed description thereof is given here.

Figure 15:
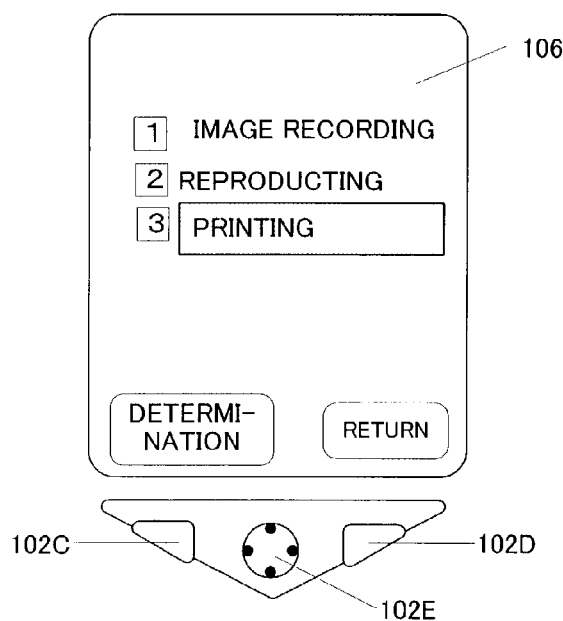
FIGS. 15A and 15B illustrate example menus presented on display means of a mobile phone in a case where printing is designated.
Figure 15:
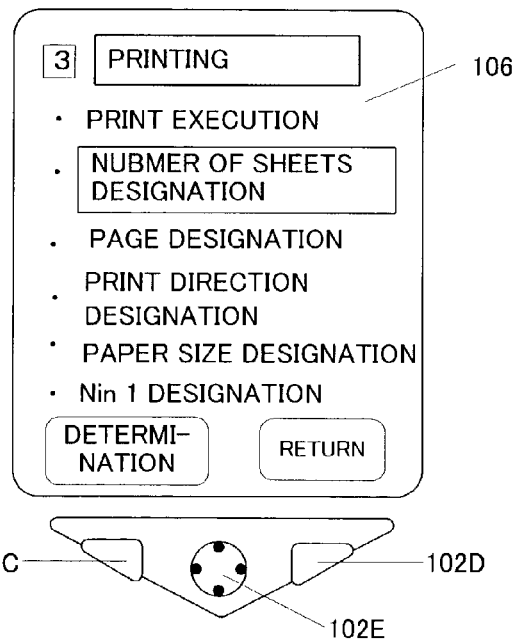

On the other hand, when printing is designated, "PRINTING", as shown in FIG. 15A is selected using the key 102E. When the key 102E is pushed down in this state, a state is obtained in which the number of print sheets or the like can be selected, as shown in FIG. 15B. After the number of print sheets or the like is selected using the keys 102F to 102Q in this state, the key 102E is pushed down. Operations after the key 102E is pushed down are as described in the first embodiment.

Figure 3:
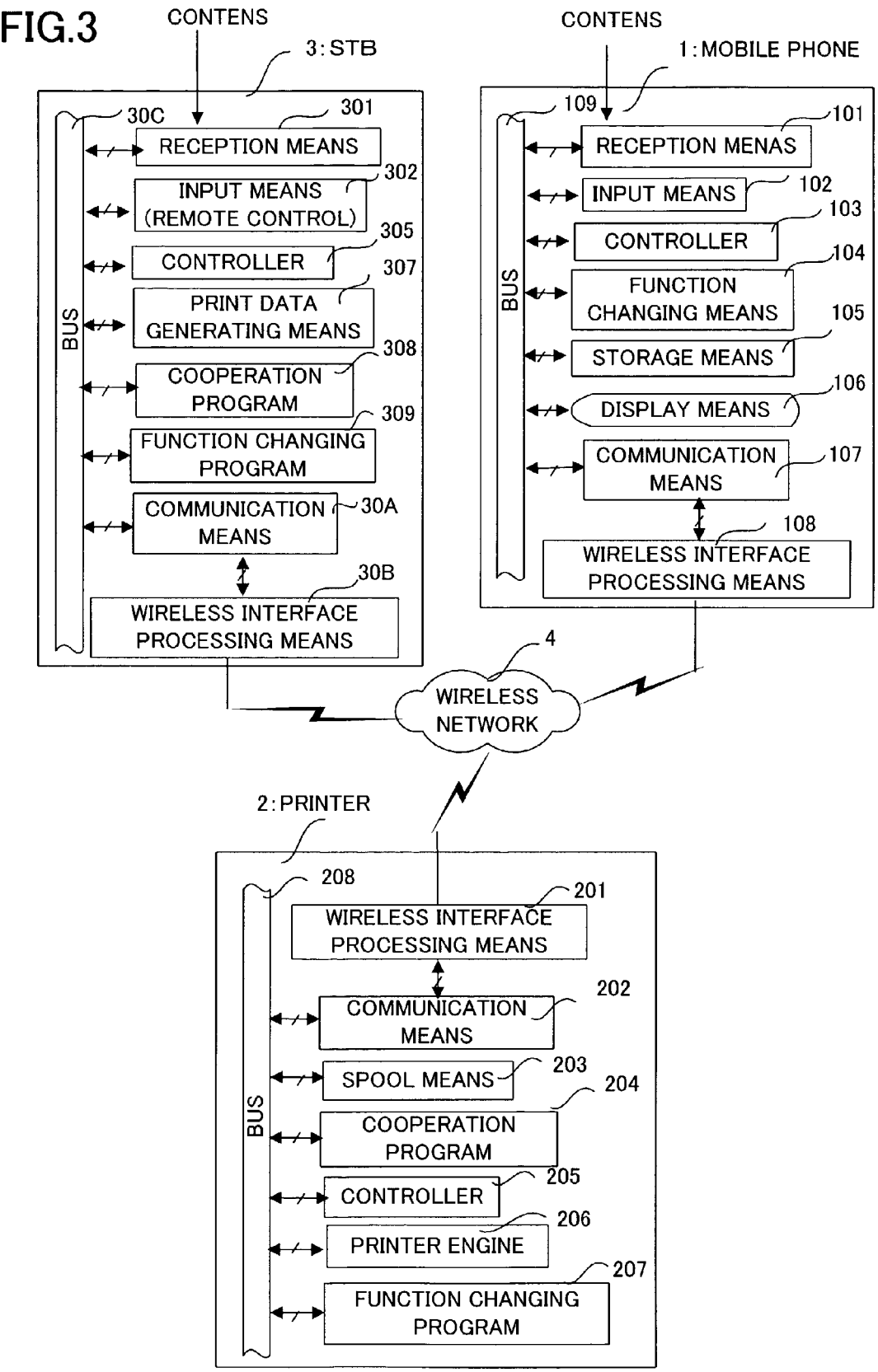
FIG. 3 is a diagram of construction of another cooperation system in the second embodiment.

When printing is designated in this way, however, the set top box 3 and the printer 2, as shown in FIG. 3 for example, are connected through the wireless net work 4 in advance. By doing so, contents received by receive means 301 are converted to print data by print data generating means 307 and thereafter, the print data is transmitted to the printer 2.

According to the present invention, as described above, the mobile phone 1 can be used as a pointing device of the set top box 3 with a simple method to install the function changing program 309 stored in advance in the set top box 3, into the mobile phone 1.

Though it is true that there is a case where a remote control 302 is also provided in the set top box 3 in advance, no display means is also sometimes available in the remote control. In such a situation, needless to say that application of the present invention improves operability of the set top box 3 by a huge margin.

Note that while, in the above description, not only are the function changing programs 207 and 309 written in Java language, but the mobile phone 1 having an operating environment for i-appli therein is also used, the present invention is not limited to this construction. That is, since a construction is adopted in which a function changing program can be executed without depending on a kind of an OS of the mobile phone 1 or a kind of microprocessor, there can be obtained an effect similar to the above described one. Alternatively, a construction may also be adopted in which plural function changing programs corresponding to a kind of an OS of the mobile phone 1 and a kind of microprocessor, respectively, are stored in the printer 2 or the like in advance and a function changing program corresponding to a kind thereof is selectively installed into the mobile phone.

While in the above description, a function changing program is stored in the printer 2 or the set top box 3 (hereinafter collectively referred to as "a control device") in advance, the present invention is not limited to this way. An effect similar to the above described one can be obtained, for example, in a case, too, where a function changing program is stored in the storage means 105 of the mobile phone 1 in advance.

Alternatively, a construction may be adopted in which function changing programs are stored in a web server not shown and the receive means 301 of a controlled device or the receive means 101 of the mobile phone 1 receives a function changing program from the web server as occasion arises. With such a construction, there can be enjoyed a merit of easy version upgrading of a function changing program.

While, likewise, in the above description, a cooperation program is stored in a controlled apparatus in advance, the present invention is not limited to this construction. That is, an effect similar to the above described one can be enjoyed in a construction in which a cooperation program is stored in a web server not shown and the receive means 301 of a controlled apparatus receives the cooperation program from the web server as occasion arises.

Furthermore, while in the above description, a connection request is issued to the mobile phone 1 by a controlled apparatus, the present invention is not limited to this way. That is, an effect similar to the above described one can be enjoyed in a case in which while the mobile phone 1 issues a connection request to a controlled apparatus, operations after the connection is established are the same as in the above description.

Third Embodiment

In the first and second embodiments, description is given of a construction in which one function changing program 207 is stored in the storage means 105 of the mobile phone 1. However, there is a case in which a desire arises to execute a function changing program 207 corresponding to a situation at the time in consideration among plural function changing programs 207.

Figure 16:
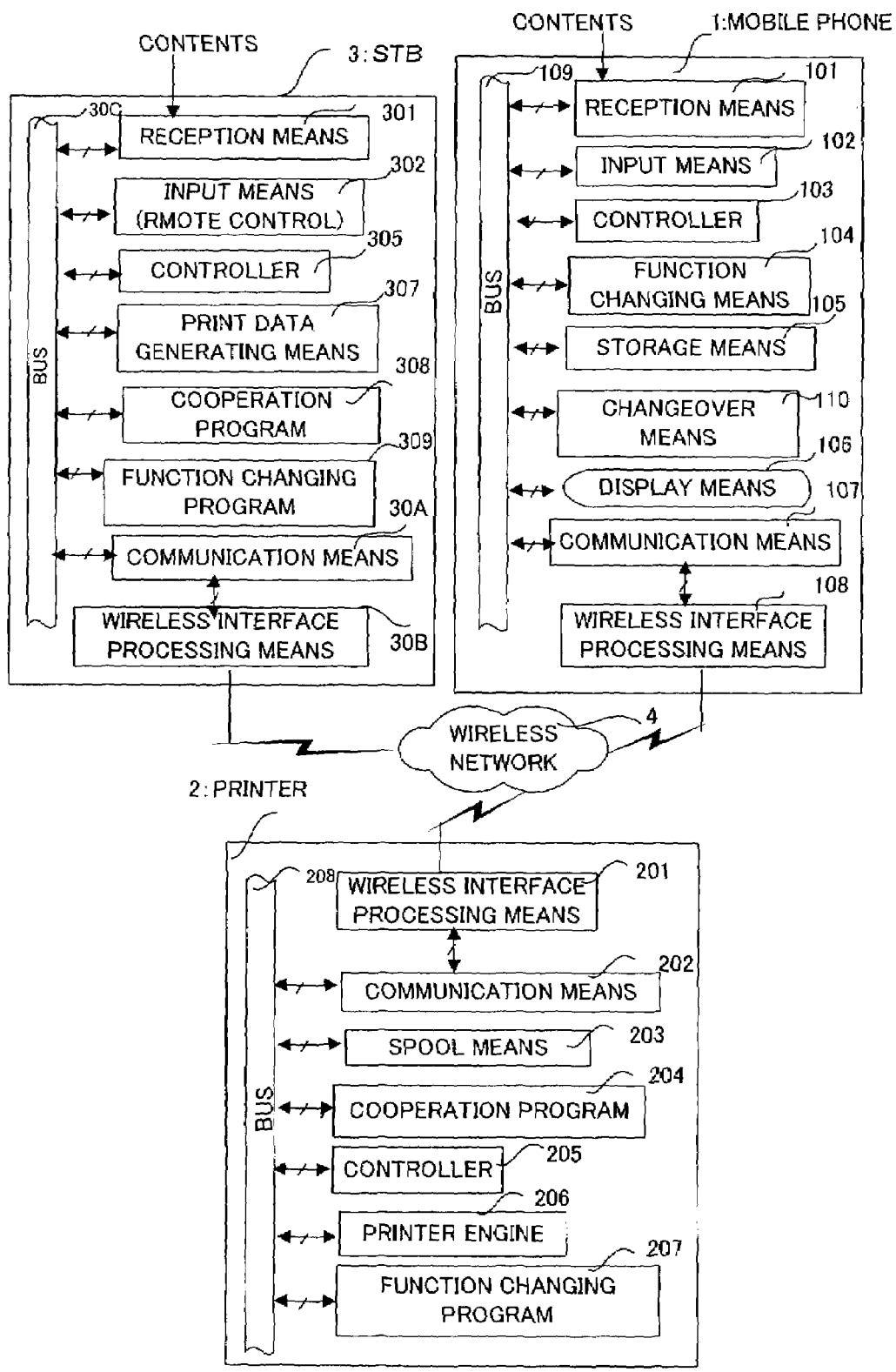
FIG. 16 is a diagram of construction of a cooperation system in a third embodiment.

Therefore, in this embodiment, a case is taken up in which the mobile phone 1 includes a changeover means 110 changing over to a function changing program to be executed as shown in FIG. 16 as occasion arises. The changeover means 110 can be realized, for example, by executing a program obtained from a controlled apparatus or the like. The "program obtained from a controlled apparatus" may be either part of a function changing program or a program different from a function changing program.

Detailed description will be given of this embodiment below using FIGS. 17 to 19. Note that no detailed description here will be given of aspects having been described in the first and second embodiments.

First of all, description will be given of a construction shown in FIG. 17. The construction is basically the same as the construction shown in FIG. 3. Communication means of the mobile phone 1 issues a connection request to the set top box 3 (in FIG. 17, step S1). When, by doing so, connection is established between the mobile phone 1 and the set top box 3, a function changing program is transmitted from the set top box 3 to the mobile phone 1 (in FIG. 7, step S2). Note that, in the following description, this function changing program is referred to as a "function changing program P1."

The above function changing program P1, after being stored in storage means of the mobile phone 1, is activated by a controller of the mobile phone 1. Thereafter, a cooperation means of the set top box 3 and a function changing means of the mobile phone 1 operate in cooperation with each other.

Figure 17:
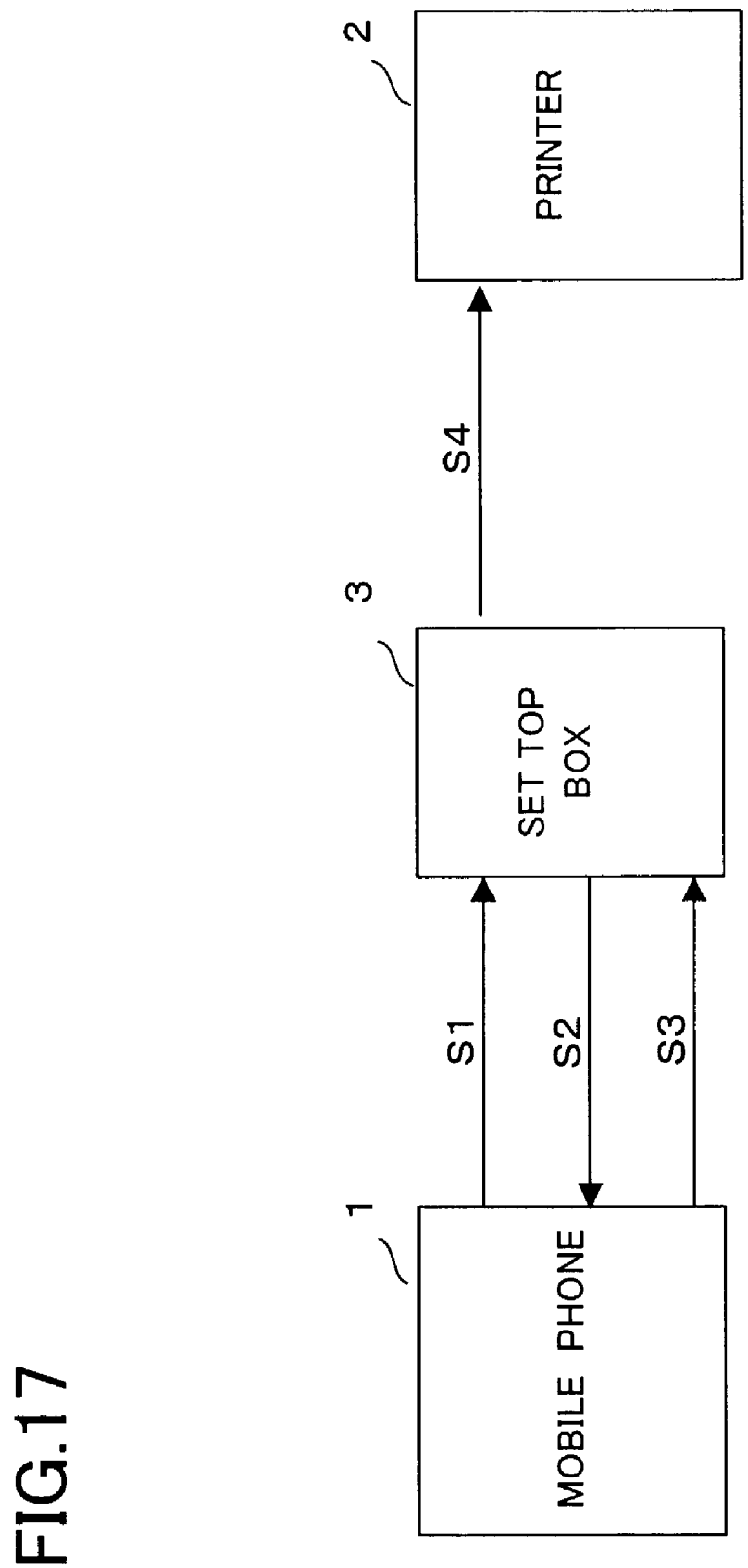
FIG. 17 is a diagram for describing changeover between function changing programs.

That is, when a print command is issued to the set top box 3 from the mobile phone 1, the set top box 3 having accepted the command transmits contents, which are a print object, to the printer 3 (in FIG. 17, steps3 to S4). The contents having been thus transmitted are naturally printed by the printer 2.

Then, description will be given of a construction shown in FIG. 18.

Figure 18:
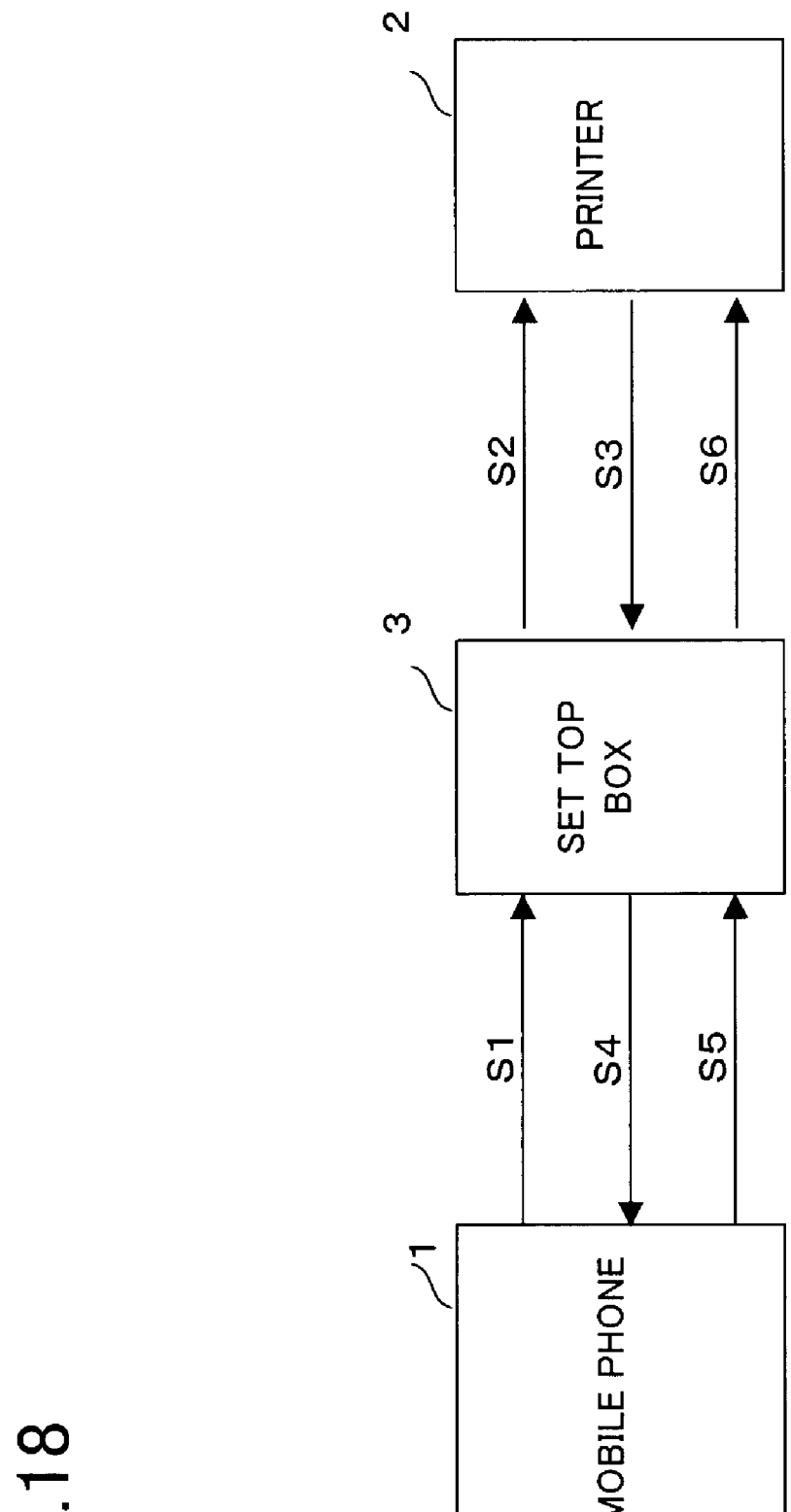
FIG. 18 is a diagram for describing changeover between function changing programs.
Figure 19:
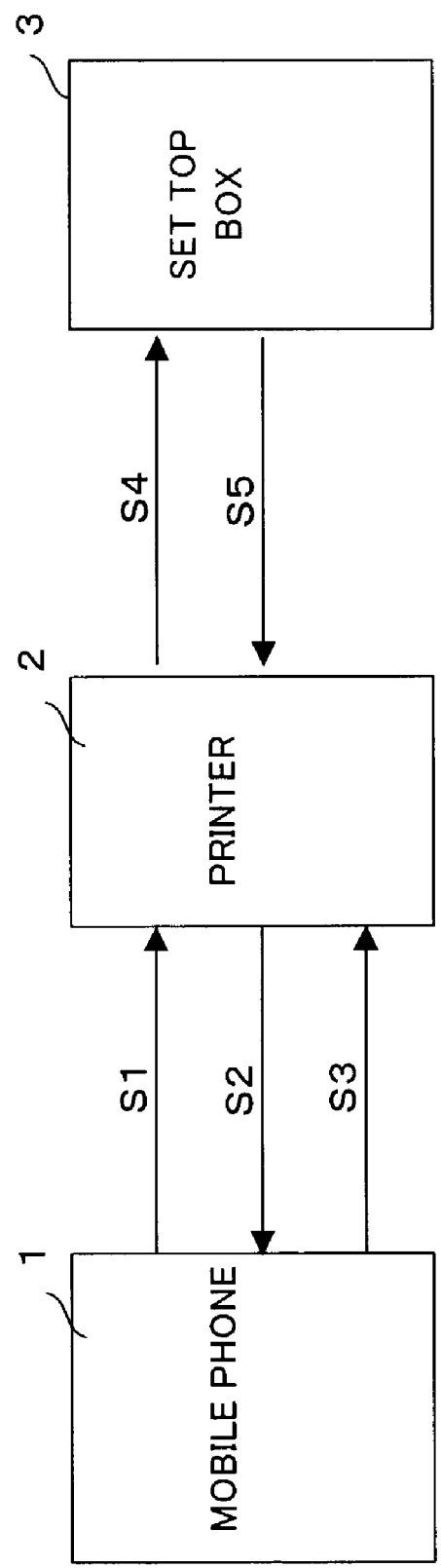
FIG. 19 is a diagram for describing changeover between function changing programs.

Communication means of the mobile phone 1 issues a connection request to the set top box 3 (in FIG. 18, step S1). By doing so, when connection is established between the mobile phone 1 and the set top box 3, the set top box 3 issues a link command to the printer 2 (in FIG. 18, step S2). The printer 2 having accepted the link command transmits a function changing program to the set top box 3 (in FIG. 18, step S3). The function changing program is transferred to the mobile phone 1 via the set top box 3 (in FIG. 18, step S4). Note that in the following description, this function changing program is referred to as a "function changing program P2."

The above function changing program P2, after being stored in storage means of the mobile phone 1, is activated by a controller of the mobile phone 1. Thereafter, cooperation means of the printer 2 and function changing means of the mobile phone 1 operate in cooperation with each other.

That is, when a print command is issued to the set top box 3 from the mobile phone 1, the set top box 3 having accepted the command transmits contents, which are a print object, to the printer 2 (in FIG. 18, step S5 to step S6). The contents having been thus transmitted are naturally printed by the printer 2.

Since, according to the construction, the mobile phone 1 and the printer 2 operate in cooperation with each other, a load imposed on the set top box 3 can be alleviated as compared with the construction shown in FIG. 17. In consideration of the fact that generally a use frequency of the set top box 3 is higher than a use frequency of the printer 2, a merit of adopting the construction is high.

Then, description will be given of a construction shown in FIG. 19.

Communication means of the mobile phone 1 issues a connection request to the printer 2. When, by doing so, connection is established between the mobile phone 1 and the printer 2, a function changing program is transmitted to the mobile phone 1 from the printer 2. Note that, in the following description, this function changing program is referred to as a "function changing program P3."

The function changing program P3, after being stored in storage means of the mobile phone 1, is activated by a controller of the mobile phone 1. Thereafter, cooperation means of the printer 2 and function changing means of the mobile phone 1 operate in cooperation with each other.

That is, when a print command is issued to the printer 2 from the mobile phone 1, the printer 2 having accepted the command issues an acquirement request for contents to the set top box 3 (in FIG. 18, step S3 to step S4). Naturally, in order to acquire contents, which is an object, from the set top box 3 in such a way, a necessity arises for notifying acquirement source information (hold site information) of the contents to the mobile phone 1 from the set top box 3 in advance. While a notification method of the information is not specifically limited, a method is preferably adopted in which an electronic mail in which the hold site information of the contents is written is transmitted to the mobile phone 1 from the set top box 3.

The set top box 3 having accepted the acquirement request returns the contents to the printer 2 (in FIG. 18, step S5). The contents having been thus returned are naturally printed by the printer 2.

According to the construction, the user staying adjacent to the printer 2 can print contents held by an apparatus (herein the set top box 3) at a remote site. If consideration given to the fact that when the contents are otherwise printed, the user has to come near the printer 2 in order to obtain printed matter, a merit of adopting this construction is great.

Three function changing programs P1 to P3 here are stored in the storage means of the mobile phone 1. Therefore, in subsequent operations, a function changing program corresponding to a situation at the time in consideration can be executed among the three function changing programs P1 to P3.

It is natural that the function changing program P1 has only to be executed in the situation shown in FIG. 17. In the situation shown in FIG. 18, the function changing program P2 has only to be executed. Furthermore, in the situation shown in FIG. 19, the function changing program P3 has only to be executed.

A necessity exists for making contact with a user to inquire which function changing program is executed. A way of the inquiry is not specifically limited but a example will be described according to FIG. 16.

At first, the function changing means 104 of the mobile phone 1, as described in the first embodiment, presents a message such as saying "IS A FUNCTION CHANGED?" on the display means 106. With the message on the display means 106, when there arises a reply to the effect that a function is changed, a changeable function list is presented on the display means 106. The "changeable function list" is a function list of function changing programs stored in the storage means 105 of the mobile phone 1.

The changeover means 110 of the mobile phone 1 changes over a function changing program to be executed on the basis of a command of the user. Naturally, when receiving a command to change to a function realized by the function changing program P1, the changeover means 110 executes the function changing program P1 instead of a function changing program currently in execution. Furthermore, when receiving a command to change to a function realized by the function changing program P2, the changeover means 110 executes the function changing program P2 instead of a function changing program currently in execution. Moreover, when receiving a command to change to a function realized by the function changing program P3, the changeover means 110 executes the function changing program P3 instead of a function changing program currently in execution.

According to this embodiment, as described above, a function changing program corresponding to the situation at the time in consideration can be executed among plural function changing programs. With such a construction adopted, a merit of easy operability can be enjoyed in a case where one portable terminal is used as a pointing device of plural controlled apparatuses.

Note that, while in the above description, the three function changing programs P1 to P3 are acquired from respective separate apparatuses, the present invention is not specifically limited to this construction. For example, the three function changing programs P1 to P3 may be stored in the storage means 105 of the mobile phone 1 in advance.

Alternatively, in the situation shown in FIG. 17, the three function changing programs P1 to P3 may be stored in the set top box 3. In this case, the mobile phone 1 can collectively acquire the three function changing programs P1 to P3 from the set top box 3. In the situation shown in FIGS. 18 and 19, it is natural that the three function changing programs P1 to P3 may be stored in the printer 2 in advance.

Fourth Embodiment

While, in the first to third embodiments, not only is the mobile phone 1 exemplified as a portable terminal but the printer 2 or the set top box 3 are also exemplified as a controlled apparatus controlled by the portable terminal, the present invention is not specifically limited to the construction. That is, PDA (Personal Digital Assistance) can also be adopted as a portable terminal and furthermore, an air conditioner, a microwave oven or the like can be adopted as a controlled apparatus. In this case, setting of temperature or setting of running time can be realized using the portable terminal as similar to the above first to third embodiments.

However, there is a case to which the above description is not applied as is according to a portable terminal or a controlled apparatus to be adopted because of functionality and specialty in application thereof. Detailed description will be given of the aspects below.

At first, a case is considered in which the mobile phone 1 capable of receiving ground wave digital television broadcast is adopted as a portable terminal. In this case, a frame picture of television broadcast received by the mobile phone 1 is transmitted to the printer 2, which is a controlled apparatus, the frame picture can be printed.

A method to designate a frame image to be printed is not specifically limited. For example, when a scene, which is an object, is presented on display means of the mobile phone 1, a frame picture of the scene can be designated by pushing down the print command key that the mobile phone 1 has therein.

While the frame picture having been designated as described above, here, is stored into the storage means of the mobile phone 1, a capacity of the storage means of the mobile phone 1, generally, is extremely small. Therefore, in this case, the frame picture is transferred to an apparatus with large capacity memory means (for example, a home PC). With such a construction adopted, it is possible to effectively utilize the storage means of the potable terminal such as a mobile phone having a small capacity.

The frame picture, when the printer 2 issues an acquirement request, is transmitted to the printer 2 from the PC to print. Since a system for printing are the same as that described using FIG. 19, detailed description thereof, here, will be repeated.

As a different example, a case can be taken up where a digital camera is adopted as a portable terminal. That is, a picture shot by a digital camera is recorded in a transportable record medium such as a memory card loaded in the digital camera. The memory card is loaded into a card slot of the printer 2, which is a controlled apparatus. Thereby, the printer 2 prepares a thumbnail of a picture recorded on the memory card to transmits it to the digital camera.

With such a procedure adopted, a user of the digital camera takes a look at the thumbnail received from the printer 2 to thereby easily select a picture to be printed. A merit can also be enjoyed that a heavy processing to prepare a thumbnail can be executed on the controlled apparatus (printer 2) side.

Naturally, a digital camera may also be adopted as a controlled apparatus. In this case as well, a portable terminal such as the mobile phone 1 is used as a pointing device of the digital camera.

According to the construction, a shutter operation of a digital camera mounted on a tripod can be performed from the mobile phone 1. In this case, a shot picture is preferably presented on the display means of the mobile phone 1. Furthermore, it is also effective that a shot picture is transferred to an apparatus with a large capacity storage means. Moreover, it is convenient that not only a shutter operation of a digital camera but also mode setting can be performed from the mobile phone 1.

Note that while a digital camera is exemplified here, an IP camera may be adopted instead of a digital camera, The "IP camera" is a camera having a function of directly connecting to a network. In this case, it is possible to recognize an operation setting of and an obtained image by the IP camera from the portable terminal such as the mobile phone 1 via a network according to IP (Internet Protocol).

Furthermore, in the above description, no specific reference is made to a method to transfer a picture to a home PC or the like. A transfer method is not specifically limited but it is simple to transmit a picture, which is a transfer object, to a home PC attaching the picture to an electronic mail.

According to the present invention, as described above, since a portable terminal can be used as a pointing device of a controlled apparatus, even a controlled apparatus (for example, a printer) difficult to adopt a pointing device can be improved on its operability by a huge margin.

What is claimed is:

1. A portable terminal comprising:
communication means for receiving from a controlled apparatus a function changing program which is a program for changing a function of the portable terminal so as to function as operation means allowed to operate the controlled apparatus via radio communication; and
function changing means realized as the operation means for the controlled apparatus by executing the received function changing program,
wherein the function changing means operates the controlled apparatus by cooperating with a cooperation means that is provided to the controlled apparatus and can cooperate with the function changing means via radio communication, and
the function changing means notifies a user of a correspondence between a regular function of each button of the portable terminal and a function after a change thereof of each button.

2. The portable terminal according to claim 1, further comprising:
changeover means for changing over the function changing program to be executed as occasion arises.

3. The portable terminal according to claim 2, wherein the function changing means returns a function after a change of the portable terminal to a regular function thereof when a call is received or a specific key is pushed down.

4. The portable terminal according to claim 1, wherein not only is the function changing program written in an intermediate language not depending on a type of an OS (Operating System) or a type of a microprocessor, but the portable terminal has an operating environment for the function changing program therein.

5. The portable terminal according to claim, wherein the function changing means makes contact with a user and inquires whether or not a function of the portable terminal is changed.

6. The portable terminal according to claim 1, wherein the function changing means makes contact with a user and inquires whether or not a function of the portable terminal is changed when a call is received.

7. The portable terminal according to claim 1, wherein the function changing means makes contact with a user and inquires whether or not a function of the portable terminal is changed when a call is received providing information on a transmitter to the user.

8. A cooperation system in which a portable terminal and a controlled apparatus operate in cooperation with each other, wherein
the portable terminal includes:
communication means for receiving from the controlled apparatus a function changing program which is a program for changing a function of the portable terminal so as to function as operation means allowed to operate the controlled apparatus via radio communication; and
function changing means realized as the operation means for the controlled apparatus by executing the received function changing program, wherein the function changing means notifies a user of a correspondence between a regular function of each button of the portable terminal and a function after a change thereof of each button, and
the controlled apparatus includes:
communication means for transmitting the function changing program, which is a program implemented in the controlled apparatus in advance for changing a function of the portable terminal so as to function as the operation means of the controlled apparatus, to the portable terminal; and
cooperation means for controlling the controlled apparatus by operating in cooperation with the function changing program being executed on the portable terminal.

9. The cooperation system according to claim 8, further comprising:
changeover means for changing over the function changing program to be executed as occasion arises.

10. The cooperation system according to claim 8, wherein the portable terminal is a mobile phone, a PDA (Personal Digital Assistance) or a digital camera.

11. The cooperation system according to claim 8, wherein the controlled apparatus is an imaging apparatus capable of printing data or a receiver capable of receiving contents written in BML (Broadcast Markup Language) from a broadcast station.

12. The cooperation system according to claim 8, wherein the portable terminal records image data in a transportable record medium, and
the controlled apparatus reads image data recorded in the transportable record medium to prepare a thumbnail image and to transmit it to the portable terminal.

13. A cooperation method of causing a portable terminal and a controlled apparatus to operate in cooperation with each other, comprising the following steps:
a transmission step of transmitting from the controlled apparatus to the portable terminal a function changing program, which is a program for changing a function of the portable terminal so as to function as operation means allowed to operate the controlled apparatus via radio communication;
an installing step of installing the received function changing program in the portable terminal;

an execution step of executing the function changing program on the portable terminal to realize the operation means for the controlled apparatus;

a notification step by the portable terminal of notifying a user of a correspondence between a regular function of each button of the portable terminal and a function after a change thereof of each button; and an operation step of operating the controlled apparatus by cooperating with a cooperation means that is provided to the controlled apparatus and can cooperate with the operation means via radio communication.

14. The cooperation method according to claim 13, further comprising the following step:

a changeover step of changing over the function changing program to be executed as occasion arises.

15. A computer program product having a computer readable medium bearing a program, when executed, causing a portable terminal to perform as communication means for receiving from a controlled apparatus a function changing program which is a program for changing a function of the portable terminal so as to function as operation means allowed to operate the controlled apparatus via radio communication; and function changing means realized as the operation means for the controlled apparatus by executing the received function changing program, wherein the function changing means operates the controlled apparatus by cooperating with a cooperation means that is provided to the controlled apparatus and can cooperate with the function changing means via radio communication, and the function changing means notifies a user of a correspondence between a regular function of each button of the portable terminal and a function after a change thereof of each button.

* * * * *

UNITED STATES PATENT AND TRADEMARK OFFICE
CERTIFICATE OF CORRECTION

| | | |
|---|---|---|
| PATENT NO. | : 6,999,790 B2 | Page 1 of 1 |
| APPLICATION NO. | : 10/246766 | |
| DATED | : February 14, 2006 | |
| INVENTOR(S) | : Kouichi Takamine et al. | |

It is certified that error appears in the above-identified patent and that said Letters Patent is hereby corrected as shown below:

Column 14, line 1, change "terminal according to claim, wherein" to
- - terminal according to claim 1, wherein - -.

Signed and Sealed this

Twenty-second Day of August, 2006

JON W. DUDAS
*Director of the United States Patent and Trademark Office*